United States Patent
Sugimoto

[11] Patent Number: 6,061,001
[45] Date of Patent: May 9, 2000

[54] OBJECT DETECTING APPARATUS

[75] Inventor: Yoichi Sugimoto, Saitama, Japan

[73] Assignee: Honda Giken Kogyo Kabushiki Kaisha, Tokyo, Japan

[21] Appl. No.: 09/368,899

[22] Filed: Aug. 6, 1999

[30] Foreign Application Priority Data

Aug. 7, 1998 [JP] Japan .................................. 10-224350

[51] Int. Cl.$^7$ ...................................................... G08G 1/16
[52] U.S. Cl. .......................... 340/903; 367/909; 180/169; 180/170; 340/901
[58] Field of Search ..................................... 340/435, 436, 340/901, 903, 904; 342/70, 71, 72; 367/909, 96, 97, 107, 112; 180/167, 168, 169, 170

[56] References Cited

U.S. PATENT DOCUMENTS

| | | | |
|---|---|---|---|
| 3,778,823 | 12/1973 | Sato et al. | 343/7 ED |
| 5,471,214 | 11/1995 | Faibish et al. | 342/70 |
| 5,754,099 | 5/1998 | Nishimura et al. | 340/435 |
| 5,831,717 | 11/1998 | Ikebuchi | 356/4.01 |

FOREIGN PATENT DOCUMENTS 8-240660  9/1996  Japan .

*Primary Examiner*—Jeffery A. Hofsass
*Assistant Examiner*—Hung Nguyen
*Attorney, Agent, or Firm*—Arent Fox Kinter Plotkin & Kahn PLLC

[57] ABSTRACT

The detection region to which the electromagnetic wave from a vehicle is transmitted ahead in a direction of movement of the vehicle in order to detect an obstacle such as another vehicle in front or the like, is composed of a first detection region looking slightly upward with respect to the road surface and a second detection region looking slightly downward with respect to the road surface. Received signal strengths of reflected waves in the first and second detection regions are compared with each other. When the two received signal strengths are substantially equal to each other, the vertical angle of the object detecting apparatus is judged adequate. When the received signal strength of the reflected wave in the upper-side, first detection region is larger, the angle is judged downward. When the received signal strength of the reflected wave in the lower-side, second detection region is larger, the angle is judged upward and the angle for attachment of the object detecting apparatus is adjusted automatically.

6 Claims, 6 Drawing Sheets

OBJECT DETECTING APPARATUS

BACKGROUND OF THE INVENTION

1. Field of the Invention

The present invention relates to an object detecting apparatus for detecting an object by transmitting electromagnetic waves such as laser beams or millimeter waves to the object and receiving reflected waves due to reflection of the electromagnetic waves from the object.

2. Description of the Related Art

For example, Unexamined Japanese Patent Publication (kokai) No. Hei. 8-240660 discloses an object detecting apparatus for detecting an object serving as an obstacle by receiving a reflected wave due to reflection of an electromagnetic wave such as a laser beam or the like transmitted ahead in a direction of movement of a vehicle. The apparatus thereby generates an alarm or performs an avoidance motion automatically in order to avoid a collision with the object.

Such an object detecting apparatus is intended to detect an obstacle such as a vehicle running in front or the like existing on a course of its own vehicle. Consequently, it is undesirable that a pedestrian bridge, a land bridge, a traffic sign, cat's eyes, or the like, which would not be an obstacle, is detected as an obstacle by mistake. Therefore, the vertical width between upper and lower limits of a detection region to which an electromagnetic wave is transmitted may be preferably set to be narrow and the detection region may be preferably disposed to be substantially parallel with the road. If the vertical width between upper and lower limits of the detection region is set to be narrow, however, there is a possibility that a pedestrian bridge, a land bridge, a traffic sign, cat's eyes, or the like, is detected by mistake because an original obstacle such as a vehicle running in front, or the like, cannot be detected when the vertical angle of the detection region changes in accordance with main factors such as accuracy in attachment of the object detecting apparatus to a vehicle body, nose up caused by sudden acceleration, nose dive caused by sudden braking, undulation of the road surface, loading condition, etc.

SUMMARY OF THE INVENTION

It is an object of the present invention is to provide an object detecting apparatus in which the vertical displacement of the detection region to which the electromagnetic wave is transmitted is judged securely.

In order to achieve the above object, according to a first aspect of the present invention, an object detecting apparatus of a vehicle comprises: transmission unit for transmitting electromagnetic waves to a plurality of detection regions which are placed at angles different from each other vertically but overlap each other so as to contain a region parallel with a road surface in order to irradiate an object in front in a direction of movement of the vehicle; reception unit for receiving reflected waves due to reflection, from the object, of the electromagnetic waves transmitted by the transmission unit; object detection unit for detecting the object in front in the direction of movement of the vehicle on the basis of a result of reception by the reception unit; comparison unit for comparing received signal strengths of the reflected waves in the plurality of detection regions; and judgment unit for judging up-down gradients of the detection regions with respect to the road surface on the basis of a result of comparison by the comparison unit.

With the aforementioned configuration, the received signal strengths of the reflected waves in the plurality of detection regions placed at angles different from each other vertically are compared by the comparison unit and the up-down gradients of the detection regions are judged by the judgment unit on the basis of a result of comparison by the comparison unit. Accordingly, inadequate gradients of the detection regions caused by error in attachment of the object detecting apparatus to a vehicle body and the loading condition of the vehicle can be detected securely.

According to a second aspect of the present invention, in addition to the configuration of the first aspect, the reflected waves having the received signal strengths to be compared by the comparison unit are reflected waves from a moving object which is moving on the road surface.

With the aforementioned configuration, the comparison unit compares the received signal strengths of reflected waves from a moving object which is moving on the road surface. Accordingly, the received signal strengths of reflected waves from a traffic sign which is a stationary object located above the level of view of the vehicle or the received signal strengths of reflected waves from a cat's eye which is a stationary object located below the level of view of the vehicle are compared so that misjudgment can be prevented from occurring.

According to a third aspect of the present invention, in addition to the configuration of the first or second aspect, the comparison unit compares the received signal strengths of the reflected waves when the vehicle is in a standstill or in a constant-velocity running state.

With the aforementioned configuration, the up-down gradients of the detection regions with respect to the road surface are judged only when the vehicle is in a standstill or in a constant-velocity running state. Accordingly, misjudgment caused by change of vehicle body's attitude resulting from acceleration, deceleration or turning can be prevented.

According to a fourth aspect of the present invention, in addition to the configuration of any one of the first to third aspects, the judgment unit judges the up-down gradients of the detection regions with respect to the road surface normal when a ratio between the received signal strengths of the reflected waves in the plurality of detection regions is in a predetermined range.

With the aforementioned configuration, the up-down gradients of the detection regions are judged normal when the ratio between the received signal strengths of the reflected waves in the plurality of detection regions is in a predetermined range. Accordingly, a normal condition that the received signal strengths of the detection regions are equalized to each other can be judged exactly.

According to a fifth aspect of the present invention, in addition to the configuration of any one of the first to fourth aspects, the object detecting apparatus further comprises alarm unit for giving an alarm to a driver when the up-down gradients of the detection regions with respect to the road surface are abnormal.

With the aforementioned configuration, an alarm is given to a driver when the up-down gradients of the detection regions are abnormal. Accordingly, the driver can be securely informed of occurrence of an abnormal condition.

According to a sixth aspect of the present invention, in addition to the configuration of any one of the first to fifth aspects, the object detecting apparatus further comprises correction unit for correcting the up-down gradients of the detection regions with respect to the road surface when the up-down gradients are abnormal.

With the aforementioned configuration, the up-down gradients of the detection regions are corrected automatically when the gradients are abnormal. Accordingly, it is unnecessary to correct the gradients manually, so that facility is improved.

PREFERRED EMBODIMENTS OF THE INVENTION

Preferred embodiment of the present invention will be described below in the accompanying drawings.

Figure 1:
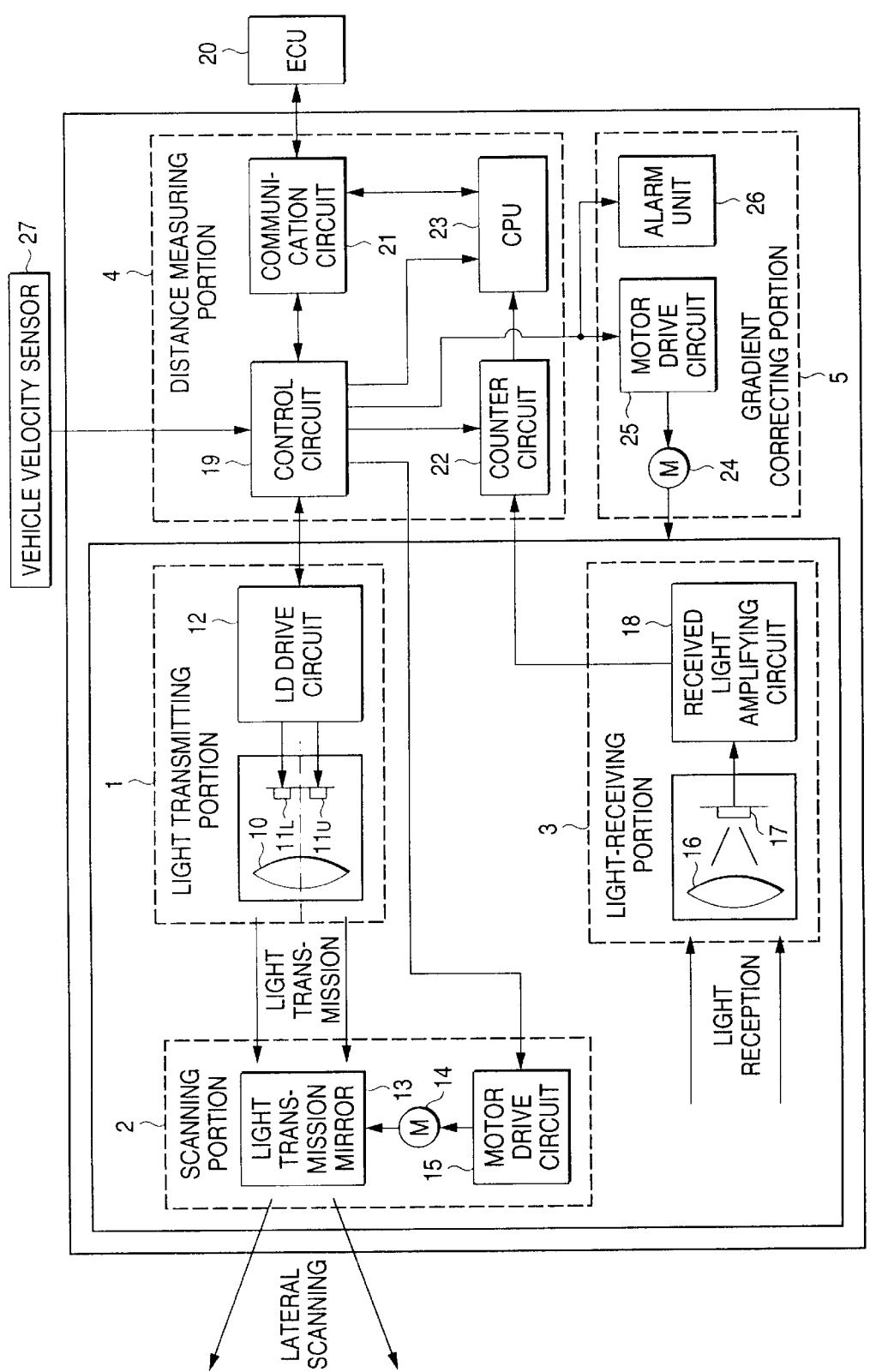
FIG. 1 is a block diagram of an object detecting apparatus.
Figure 2:
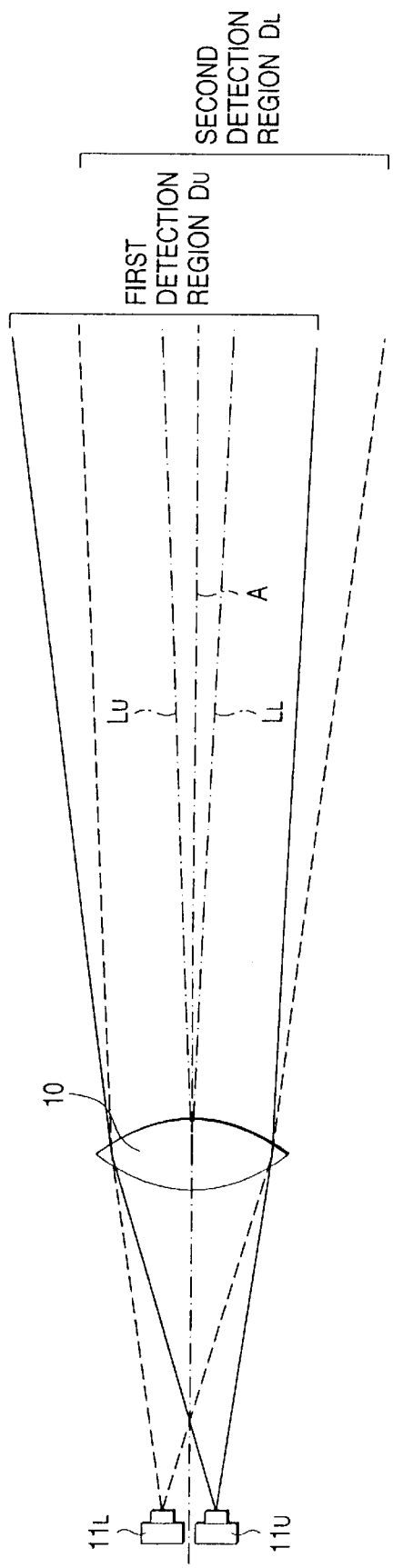
FIG. 2 is an enlarged view of the light transmitting portion.
Figure 3:
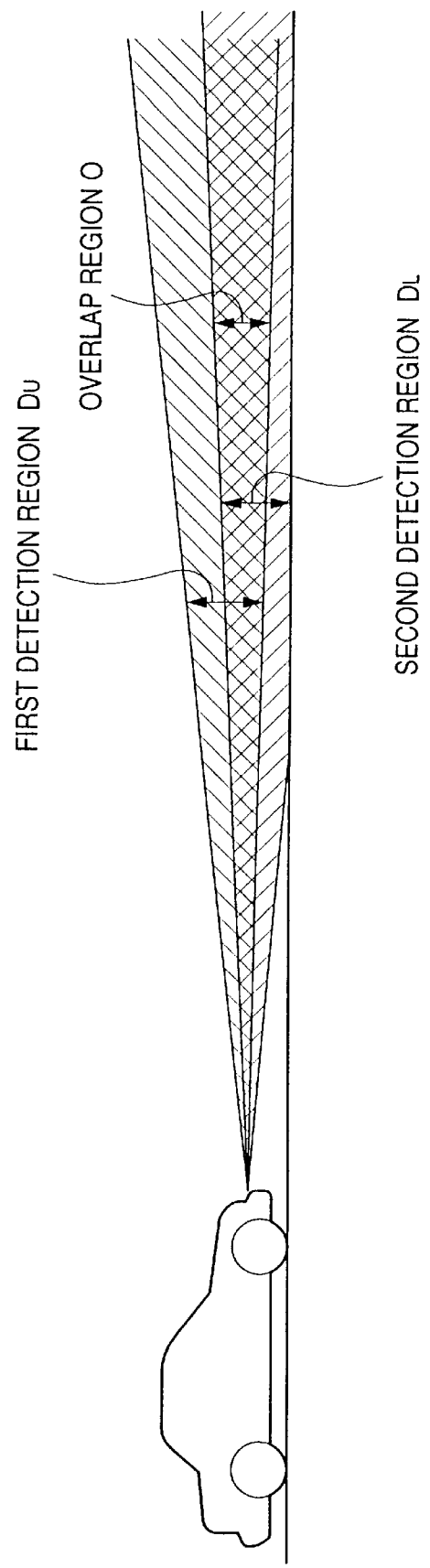
FIG. 3 is an explanatory view of the detection regions.
Figure 4:
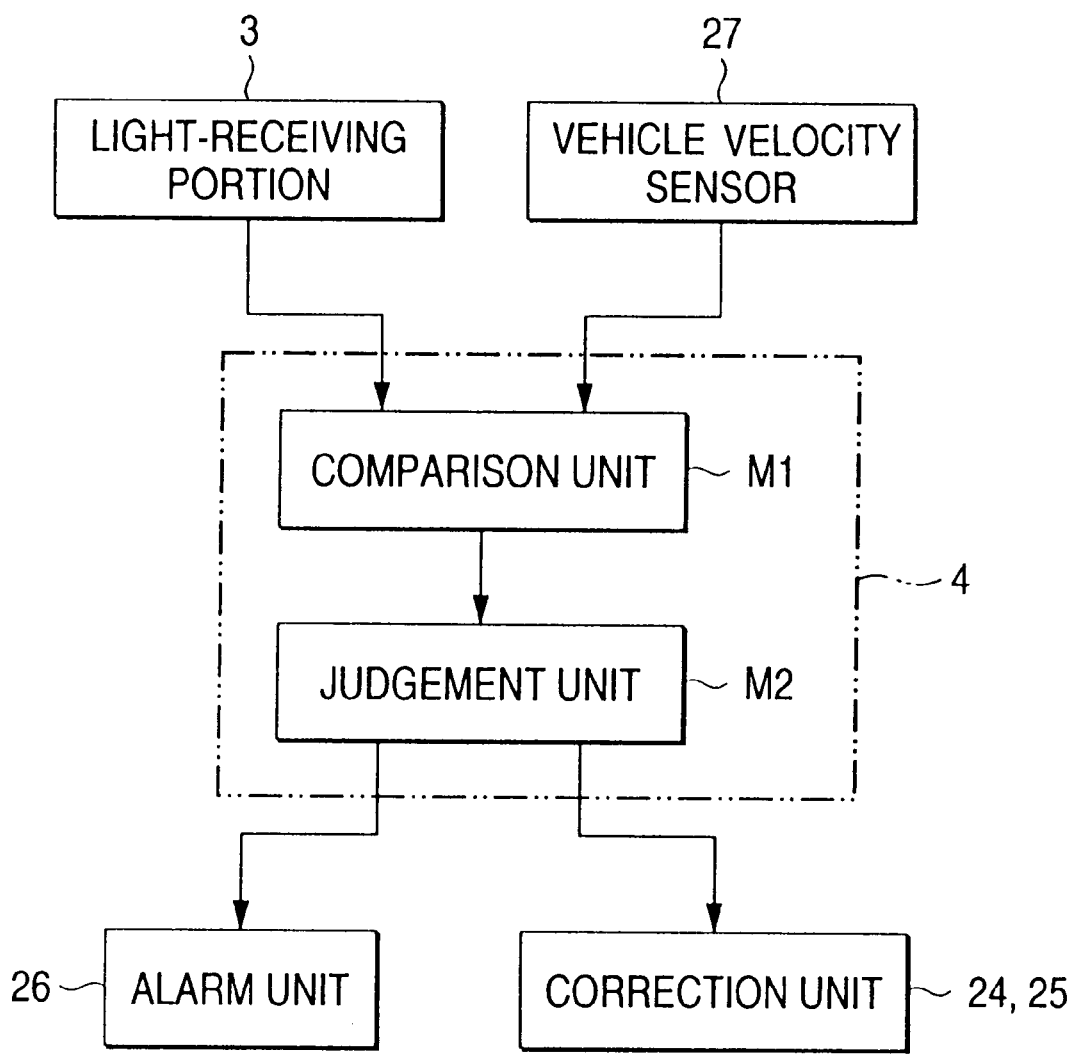
FIG. 4 is a block diagram of the gradient correcting circuit.
Figure 5:
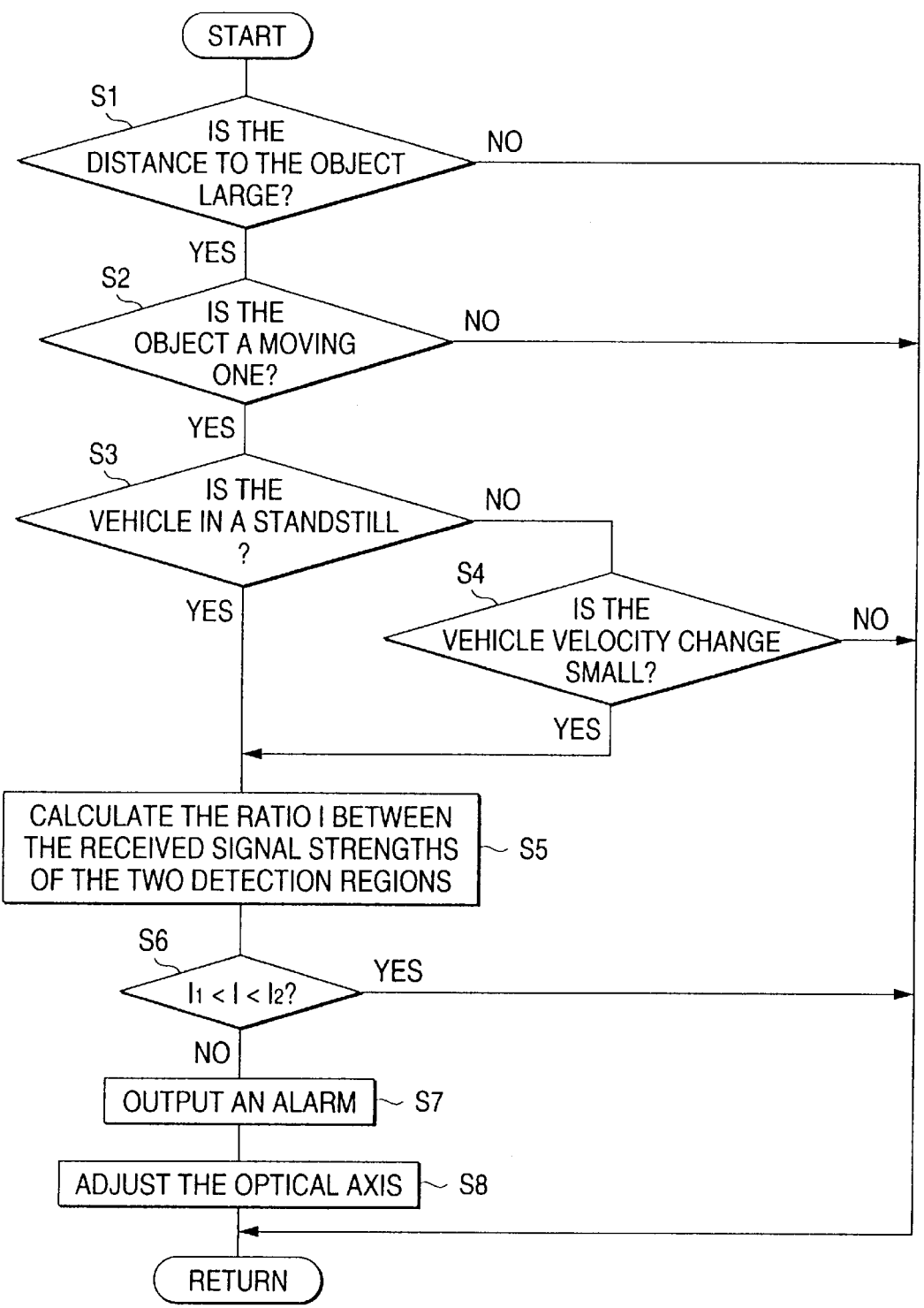
FIG. 5 is a flow chart for explaining the operation of the present invention.

FIGS. 1 to 5 show a first embodiment of the present invention. FIG. 1 is a block diagram of an object detecting apparatus. FIG. 2 is an enlarged view of the light transmitting portion. FIG. 3 is an explanatory view of the detection regions. FIG. 4 is a block diagram of the gradient correcting circuit. FIG. 5 is a flow chart for explaining the operation of the present invention.

As shown in FIG. 1, the object detecting apparatus of a vehicle for detecting the distance between the vehicle and another preceding vehicle is constituted by a light transmitting portion 1, a scanning portion 2, a light receiving portion 3, a distance measuring portion 4, and a gradient correcting portion 5. The light transmitting portion 1 is provided with a light-transmitting lens 10, a pair of upper and lower laser diodes $11_U$ and $11_L$, and a laser diode drive circuit 12 for driving the laser diodes $11_U$ and $11_L$. The scanning portion 2 is provided with a light-transmitting mirror 13 for reflecting laser beams emitted from the laser diodes $11_U$ and $11_L$, a motor 14 for rotating the light-transmitting mirror 13 laterally reciprocationally around a vertical axis, and a motor drive circuit 15 for controlling the drive of the motor 14. The laser beams irradiating from the light-transmitting mirror 13 are scanned laterally at predetermined periods. The light receiving portion 3 is provided with a light-receiving lens 16, a photodiode 17 for receiving reflected waves converged by the light-receiving lens 16 and converting the light signal into an electric signal, and an received-light amplifying circuit 18 for amplifying an output signal of the photodiode 17.

The distance measuring portion 4 is provided with a control circuit 19, a communication circuit 21, a counter circuit 22 and a central processing unit 23. The control circuit 19 controls not only the laser diode drive circuit 12 and the motor drive circuit 15 but also a motor drive circuit 25 and an alarm unit 26 which will be described later. The communication circuit 21 performs communication with an electronic control unit (ECU) 20 for controlling a cruise control unit or an automatic brake unit. The counter circuit 22 counts the time from laser-beam transmission to laser-beam reception. The central processing unit 23 calculates the distance to the object and the relative velocity of the object on the basis of the time from laser-beam transmission to laser-beam reception.

The gradient correcting portion 5 is provided with a motor 24, a motor drive circuit 25 and an alarm unit 26. The motor 24 integrally up/down rotates the light transmitting portion 1, the scanning portion 2 and the light receiving portion 3 around a lateral axis. The motor drive circuit 25 drives the motor 24 on the basis of an instruction given from the control circuit 19. The alarm unit 26 is constituted by a buzzer or a lamp to give an alarm to a driver.

The light transmitting portion 1 and the scanning portion 2 constitute the transmitting unit according to the present invention. The light receiving portion 3 constitutes the receiving unit according to the present invention. The distance measuring portion 4 constitutes the object detecting unit according to the present invention. The motor 24 and the motor drive circuit 25 in the gradient correcting portion 5 constitute the correcting unit according to the present invention.

As shown in FIGS. 2 and 3, the optical axis A of the light transmitting portion 1 (that is, the optical axis A of the light-transmitting lens 10) is disposed so as to be parallel with the road surface. A laser beam emitted from the laser diode $11_U$ disposed near to the focal point of the light-transmitting lens 10 and slightly below the optical axis A is transmitted along a center line $L_U$ directed upward at 1° with respect to the optical axis A to thereby form a first detection region $D_U$. On the other hand, a laser beam emitted from the laser diode $11_L$ disposed near to the focal point of the light-transmitting lens 10 and slightly above the optical axis A is transmitted along a center line $L_L$ directed downward at 1° with respect to the optical axis A to thereby form a second detection region $D_L$. The first and second detection regions $D_U$ and $D_L$ overlap each other in an overlap region O along the optical axis A.

When the optical axis A is disposed correctly for a vehicle in front, the received signal strengths of reflected waves in the first and second detection regions $D_U$ and $D_L$ from the vehicle in front are substantially equalized to each other because the vehicle in front is in the overlap region O in which the first and second detection regions $D_U$ and $D_L$ overlap each other. Further, the vertical width of the total detection region as a combination of the first and second detection regions $D_U$ and $D_L$ is set to be narrow enough so as not to erroneously detect pedestrian bridges, land bridges, traffic signs, cat's eyes, etc.

In such a manner, the pair of laser diodes $11_U$ and $11_L$ emit light alternately at intervals of a predetermined time to thereby transmit laser beams to the first and second detection regions $D_U$ and $D_L$ alternately. When reflected waves due to reflection of the laser beams from an object such as a vehicle in front or the like are then received by the photodiode 17 through the light-receiving lens 16, the distance to the vehicle in front is calculated on the basis of the time difference from laser-beam transmission to laser-beam reception.

FIG. 4 is a block diagram of the gradient correcting circuit provided in the distance measuring portion 4 to control the gradient correcting portion 5. The gradient correcting circuit is constituted by a comparison unit M1 and a judgment unit M2. Received signal strength signals of the reflected waves due to reflection of the pair of upper and lower laser beams emitted from the pair of upper and lower laser diodes $11_U$ and $11_L$ respectively and the vehicle velocity detected by a vehicle velocity sensor 27 (FIG. 1) are supplied to the comparison unit M1. When the vehicle velocity detected by the vehicle velocity sensor 27 satisfies a predetermined condition, the comparison unit M1 compares the received signal strength signals of the reflected waves of the pair of upper and lower laser beams. The judgment unit M2 judges the up-down gradient of the optical axis A, that is, the up-down gradients of the first and second detection regions $D_U$ and $D_L$ on the basis of a result of comparison by the comparison unit M1 and controls the operation of the gradient correcting portion 5.

The operation of the gradient correcting portion 5 will be described below with reference to FIG. 5 which is a flow chart thereof.

First, when the distance to the detected object (for example, a vehicle in front) is small in step S1 (for example, smaller than 10 m), the optical axis adjusting process is not executed. The reason is as follows. If the vehicle in front has a reflector in a high position, an intensive reflected wave from the reflector only in the upper-side, first detection region $D_U$ is received. Accordingly, the ratio I between received signal strengths in the first and second detection regions $D_U$ and $D_L$ which will be described later becomes out of 1. Consequently, the optical axis A is misjudged as being displaced even in the case where the optical axis A is disposed correctly for the vehicle in front.

When the distance to the object is sufficiently large in the step S1, the situation of the routine goes to step S2 in which a judgment is made as to whether the object is a moving one (for example, a vehicle in front) which is moving on the road surface or whether the object is a stationary one such as a traffic sign, a cat's eye or the like. The judgment as to whether the object is a moving one which is moving on the road surface or not, is made on the basis of the absolute velocity of the object. The absolute velocity of the object is calculated on the basis of the vehicle velocity of its own vehicle detected by the vehicle velocity sensor 27 and the relative velocity of the object calculated in the distance measuring portion 4. If the absolute velocity of the object is not lower than a predetermined value (for example, 10 km/h), the object can be judged to be a moving one.

When the object is not a moving one in the step S2, the optical axis adjusting process is not executed. The reason is as follows. If the object is a stationary one, there is a high possibility that the object is a traffic sign placed above or cat's eyes located below the level of view of its own vehicle and parallel with the road surface. Accordingly, the optical axis cannot be adjusted accurately even if the optical axis is adjusted for the aforementioned stationary object located above or below the level of view of its own vehicle. Therefore, to execute the optical axis adjustment accurately, the optical axis adjustment is intended for a moving object which is moving on the road surface and in a level of view of its own vehicle and in a direction parallel with the road surface.

When the object is a moving one in the step S2, the situation of the routine goes to step S3. If it is judged in the step S3 that the vehicle is not in a standstill on the basis of the vehicle velocity detected by the vehicle velocity sensor 27 and if it is judged in step S4 that the change of the vehicle velocity of the vehicle is not small, the optical axis adjusting process is not executed. The reason is as follows. When the vehicle velocity changes largely by sudden acceleration or sudden braking, the vehicle body noses up or nose-dives temporarily. As a result, the optical axis is misjudged as being displaced. Incidentally, the judgment of the step S3 need not be based on the vehicle velocity of perfect zero. When, for example, the vehicle velocity is not higher than 3 km/h, the vehicle may be judged to be in a "standstill". Also in the judgment of the step S4, the vehicle velocity change can be judged to be "a small vehicle velocity change" when acceleration or deceleration of the vehicle does not cause large nosing up or nose-diving of the vehicle body.

When the vehicle is judged to be in a standstill in the step S3 or when the vehicle velocity change of the vehicle is small in the step S4, a judgment is made that the vehicle is in a state suitable for the optical axis adjustment. As a result, the situation of the routine goes to step S5. In the step S5, the ratio $I(=r_U/r_L)$ of the received signal strength $r_U$ in the first detection region $D_U$ to the received signal strength $r_L$ in the second detection region $D_L$ is calculated. In step S6, a judgment is made as to whether the ratio I is in a predetermined range, containing 1, of $I_1<I<I_2$, or not. The threshold $I_1$, is, for example, 0.8 and the threshold $I_2$ is, for example, 1.2.

Incidentally, the received signal strengths $r_U$ and $r_L$ vary due to noise or jolting of the vehicle body. Accordingly, when the ratio $I(=r_U/r_L)$ calculated in the step S5 is expressed in an average for a predetermined time (for example, of 2 seconds), the ratio I can be calculated more accurately.

If the optical axis A is displaced upward from the horizontal direction due to error in attachment of the object detecting apparatus to the vehicle body or the loading condition of the vehicle, a vehicle in front can be sufficiently detected in the lower-side, second detection region $D_L$ whereas the vehicle in front can be little detected in the upper-side, first detection region $D_U$. As a result, the ratio $I(=r_U/r_L)$ may be reduced to be not larger than the threshold $I_1$. If the optical axis A is contrariwise displaced downward from the horizontal direction, a vehicle in front can be sufficiently detected in the upper-side, first detection region $D_U$ whereas the vehicle in front can be little detected in the lower-side, second detection region $D_L$. As a result, the ratio $I(=r_U/r_L)$ may be increased to be not smaller than the threshold $I_2$.

When the step S6 answers "No" because the optical axis A is displaced upward or downward so as to be out of the allowable range as described above, the alarm unit 26 of the gradient correcting portion 5 is operated in step S7 to give an alarm to the driver. Further, in step S8, the motor 24 is driven through the motor drive circuit 25 of the gradient correcting portion 5 to thereby integrally move the light transmitting portion 1, the scanning portion 2 and the light receiving portion 3 vertically to give feedback-control on the gradient of the optical axis A to converge the ratio $I(=r_U/r_L)$ into 1. Therefore, not only the driver can be informed of the occurrence of an abnormal condition securely but also the function of the object detecting apparatus can be fulfilled securely through adjustment of the gradient of the optical axis A, that is, through adjustment of the gradients of the first and second detection regions $D_U$ and $D_L$. Furthermore, since the gradient of the optical axis A is adjusted by the motor 24 automatically, time and labor can be saved greatly compared with manual adjustment.

When the ratio I is in the range of $I_1<I<I_2$ in the step S6, that is, when the received signal strength $r_U$ in the first detection region $D_U$ and the received signal strength $r_L$ in the second detection region $D_L$ are substantially equalized to each other, the optical axis adjusting process is not executed because it is unnecessary.

Figure 6:
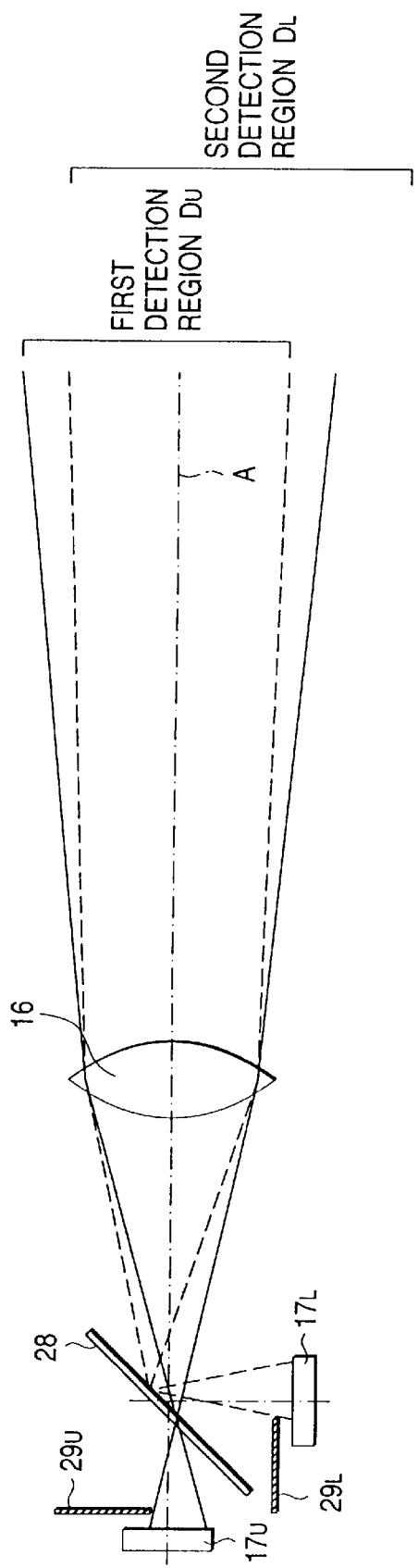
FIG. 6 is an enlarged view of the light receiving portion according to a second embodiment.

A second embodiment of the present invention will be described below with reference to FIG. 6.

In the second embodiment, configuration is made such that a single laser beam is sent from the light transmitting portion 1 and reflected waves of the laser beam are received in the light receiving portion 3 side so that a pair of upper and lower detection regions, that is, first and second detection regions $D_U$ and $D_L$ are provided. A halfmirror 28 is disposed near to the focal point of the light-receiving lens 16 so as to be inclined at 45° with respect to the optical axis A. Among reflected waves in the upper-side, first detection region $D_U$, reflected waves passed through the half mirror 28 are received in a photodiode $17_U$. Among reflected waves in the lower-side, second detection region $D_L$, reflected waves reflected from the half mirror 28 are received in a photodiode $17_L$. In this occasion, a throttle plate $29_L$ is disposed in front of the photodiode $17_L$ so that, among reflected waves in the first detection region $D_U$, reflected waves reflected from the half mirror 28 are not received in the photodiode $17_L$. Further, a throttle plate $29_U$ is disposed in front of the photodiode $17_U$ so that, among reflected waves in the second detection region $D_L$, reflected waves passed through the half mirror 28 are not received in the photodiode $17_U$.

In this manner, the same operation and effect as in the first embodiment can be obtained in the second embodiment.

Although embodiments of the present invention have been described above, various changes of the design of the present invention may be made without departing from the spirit of the present invention.

For example, laser light used in the radar system according to the embodiments may be replaced by any other electromagnetic waves such as millimeter waves, etc.

As described above, according to the first aspect of the present invention, the received signal strengths of the reflected waves in the plurality of detection regions placed at angles different from each other vertically are compared by the comparison unit and the up-down gradients of the detection regions are judged by the judgment unit on the basis of a result of comparison by the comparison unit. Accordingly, inadequate gradients of the detection regions caused by error in attachment of the object detecting apparatus to a vehicle body and the loading condition of the vehicle can be detected securely.

According to the second aspect of the present invention, the comparison unit compares the received signal strengths of reflected waves from a moving object which is moving on the road surface. Accordingly, the received signal strengths of reflected waves from a traffic sign which is a stationary object located above the level of view of the vehicle or the received signal strengths of reflected waves from a cat's eye which is a stationary object located below the level of view of the vehicle are compared so that misjudgment can be prevented from occurring.

According to the third aspect of the present invention, the up-down gradients of the detection regions with respect to the road surface are judged only when the vehicle is in a standstill or in a constant-velocity running state. Accordingly, misjudgment caused by change of vehicle body's attitude resulting from acceleration, deceleration or turning can be prevented.

According to the fourth aspect of the present invention, the up-down gradients of the detection regions are judged normal when the ratio between the received signal strengths of the reflected waves in the plurality of detection regions is in a predetermined range. Accordingly, a normal condition that the received signal strengths of the detection regions are equalized to each other can be judged exactly.

According to the fifth aspect of the present invention, an alarm is given to a driver when the up-down gradients of the detection regions are abnormal. Accordingly, the driver can be securely informed of occurrence of an abnormal condition.

According to the sixth aspect of the present invention, the up-down gradients of the detection regions are corrected automatically when the gradients are abnormal. Accordingly, it is unnecessary to correct the gradients manually, so that facility is improved.

What is claimed is:

1. An object detecting apparatus comprising:

transmission means for transmitting electromagnetic waves to a plurality of detection regions which are placed at angles different from each other vertically but overlap each other so as to contain a region parallel with a road surface in order to irradiate an object in front in a direction of movement of a vehicle;

reception means for receiving reflected waves due to reflection from said object of said electromagnetic waves transmitted by said transmission means;

object detection unit means for detecting said object in front in the direction of movement of said vehicle on the basis of a result of reception by said reception means;

comparison means for comparing received signal strengths of said reflected waves in said plurality of detection regions; and judgment means for judging up-down gradients of said detection regions with respect to said road surface on the basis of a result of comparison by said comparison means.

2. The object detecting apparatus according to claim 1, wherein said reflected waves having said received signal strengths to be compared by said comparison means are reflected waves from a moving object which is moving on the road surface.

3. The object detecting apparatus according to claim 1, wherein said comparison means compares said received signal strengths of said reflected waves when said vehicle is in a standstill or in a constant-velocity running state.

4. The object detecting apparatus according to claim 1, wherein said judgment means judges said up-down gradients of said detection regions with respect to the road surface normal when a ratio between said received signal strengths of said reflected waves in said plurality of detection regions is in a predetermined range.

5. The object detecting apparatus according to claim 1, wherein said object detecting apparatus further comprises alarm means for giving an alarm to a driver when the up-down gradients of said detection regions with respect to the road surface are abnormal.

6. The object detecting apparatus according to claim 1, wherein said object detecting apparatus further comprises correction means for correcting said up-down gradients of said detection regions with respect to the road surface when said up-down gradients are abnormal.

\* \* \* \* \*